United States Patent
Toko et al.

(10) Patent No.: US 8,687,257 B2
(45) Date of Patent: Apr. 1, 2014

(54) OPTICAL DEVICE

(75) Inventors: Yasuo Toko, Tokyo (JP); Tatsuya Saito, Tokyo (JP); Taiju Takahashi, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 4 days.

(21) Appl. No.: 13/566,015

(22) Filed: Aug. 3, 2012

(65) Prior Publication Data

US 2013/0038943 A1    Feb. 14, 2013

(30) Foreign Application Priority Data

Aug. 8, 2011 (JP) ................................ 2011-173266

(51) Int. Cl.
*G02B 26/02* (2006.01)
*G02B 26/00* (2006.01)
*G02F 1/1333* (2006.01)
*G02F 1/13* (2006.01)

(52) U.S. Cl.
USPC .............. 359/228; 359/297; 349/84; 349/193

(58) Field of Classification Search
CPC ...... G02B 26/004; G02B 26/005; G02B 3/12; G02B 3/14; G02F 1/13; G02F 1/1334
USPC .............. 349/84, 85, 86, 122, 162, 167, 182, 349/193; 359/227, 228, 297
See application file for complete search history.

(56) References Cited

U.S. PATENT DOCUMENTS

| | | | | |
|---|---|---|---|---|
| 3,915,555 A | * | 10/1975 | Leibowitz | 349/84 |
| 7,791,813 B2 | * | 9/2010 | Cernasov et al. | 359/665 |
| 8,400,593 B2 | * | 3/2013 | Fan et al. | 349/122 |
| 2008/0225374 A1 | | 9/2008 | Hayes et al. | |
| 2010/0309541 A1 | * | 12/2010 | Lo et al. | 359/292 |
| 2011/0096276 A1 | * | 4/2011 | Fan et al. | 349/122 |
| 2013/0021545 A1 | * | 1/2013 | Song et al. | 349/15 |

FOREIGN PATENT DOCUMENTS

JP    2007-531917 A    11/2007

* cited by examiner

*Primary Examiner* — David N Spector
(74) *Attorney, Agent, or Firm* — Holtz, Holtz, Goodman & Chick, PC

(57) ABSTRACT

To realize a memory effect in an optical device using the electro wetting effect. An optical device includes: first and second substrates placed opposite each other; a partition provided therebetween; a first electrode provided on one side of the first substrate, at least a part thereof overlapping with a region surrounded by the partition in a plan view; second and third electrodes provided on one side of the second substrate and which are respectively placed opposite the first electrode across the region surrounded by the partition; a smoothing layer provided on one side of the second substrate and which covers the second and third electrodes; and first and second fluid, which are incompatible, disposed in the region surrounded by the partition. The first fluid is made of a liquid body possessing polarity or conductivity, and the second fluid is made of a liquid body containing a liquid-crystalline material.

5 Claims, 3 Drawing Sheets

OPTICAL DEVICE

BACKGROUND OF THE INVENTION

1. Field of the Invention

The present invention relates to an optical device which controls light utilizing the change of position of fluids.

2. Description of the Related Art

Japanese Unexamined Patent Application Publication (Published Japanese Translation of PCT International Application) No. 2007-531917 discloses a display device based on an electro wetting effect. This display device includes a structure where two fluids, which are mutually immiscible, are disposed between two substrates which respectively include an electrode. A fluid possessing conductivity or polarity is used as one of the fluids. With this display device, the wettability of the fluid possessing conductivity or polarity can be controlled by applying a voltage between the electrodes of the respective substrates. Accordingly, for instance, if one of the two fluids is colored and the other fluid is transparent, the intensity of the light that is transmitted through the respective fluids or the intensity of the light that is reflected by the respective fluids can be controlled according to the state of the respective fluids after movement. As the foregoing two fluids, illustrated are, for instance, oil containing a dye as one fluid, and water as the other fluid. A display device based on this kind of electro wetting effect is advantageous in that it is compatible with both a reflective display and a transmissive display, capable of realizing the same level of reflectance (approximately 50%) and contrast ratio as a paper medium in the case of using a reflective display, and has a relatively fast switching speed (for instance, 10 milliseconds or less).

Meanwhile, in the foregoing related art, after electrically controlling the position of the fluids, it is necessary to continuously apply a drive current in order to maintain the foregoing state. In other words, there was no memory effect in relation to the state after the fluids are moved. Thus, for example, there is a drawback in that it is difficult to use the foregoing related art for usages which are demanded of ultra low power consumption such as with a so-called electronic paper or the like. Moreover, since there is no memory effect, it is necessary to provide a switching element such as a thin film transistor to the respective pixels when applying the technology of the foregoing related art to a dot matrix-type display device, and there is an additional drawback in that the simplification of the structure is difficult.

SUMMARY OF THE INVENTION

One object of a specific mode of the present invention is to realize a memory effect in an optical device which uses the electro wetting effect.

An optical device according to one aspect of the this invention includes: (a) first substrate and a second substrate placed opposite each other; (b) a partition provided between the first substrate and the second substrate; (c) a first electrode provided on one side of the first substrate, at least a part of the first electrode overlapping with a region surrounded by the partition in a plan view; (d) a second electrode and a third electrode provided on one side of the second substrate and which are respectively placed opposite the first electrode across the region surrounded by the partition; (e) a smoothing layer provided on one side of the second substrate and which covers the second electrode and the third electrode; and (f) a first fluid and a second fluid, which are incompatible, disposed in the region surrounded by the partition, wherein (g) the first fluid is made of a liquid body possessing polarity or conductivity, and the second fluid is made of a liquid body containing a liquid-crystalline material.

According to the foregoing configuration, after respectively moving the first fluid and the second fluid by applying a voltage between the first electrode and the second electrode or between the first electrode and the third electrode, it is possible to maintain the foregoing state. In other words, it is possible to realize a memory effect in an optical device which uses the electro wetting effect. The reason for this is considered to be a result of the relatively high viscosity of the liquid-crystalline material. As another reason, liquid crystal molecules are of an elongated molecular shape and have a tendency (molecular orientation) of the becoming aligned, and do not move easily from their position in a state where the flow is stopped. It is considered that the memory effect was realized based on the foregoing properties.

In the foregoing optical device, the second fluid preferably contains pigments (for instance, dichroic pigments). Moreover, in the foregoing case, the second fluid more preferably contains a chiral material. Dichroic pigments are also of an elongated shape as with the liquid crystal molecules, and are similarly oriented according to the oriented state of the peripheral liquid crystal molecules. When the liquid crystal molecules are in a non-torsional oriented state (state where the chiral material is not added), the polarization in the alignment direction of the dichroic pigments can be efficiently colored, but it is difficult to color the polarization that is deviated from the foregoing alignment direction. As a result of adding the chiral material, the dichroic pigments are also given a torsional oriented state together with the liquid crystal molecules, whereby the polarization of a broad polarization angle can be efficiently colored. When the polarization of all angles is to be colored, in principle a torsion of 180° is required. Here, the d/p value as the index of the additive amount of the chiral material is 0.5. When the torsion angle is set too large, the liquid crystal molecules are subject to focal conic alignment. When focal conic alignment occurs, this is undesirable since the efficiency will deteriorate in relation to the coloration of polarization. While the d/p value cannot be uniformly decided due to the used material and the like, in general the d/p value preferably does not exceed 2.0.

Consequently, it is possible to easily adjust the transmissivity, reflectance, color or brightness of the first fluid and the second fluid.

In the foregoing optical device, the first fluid is preferably water.

It is thereby possible to obtain a first fluid having superior stability at low cost.

DESCRIPTION OF THE PREFERRED EMBODIMENTS

Embodiments of the present invention are now explained with reference to the drawings.

Figure 1:
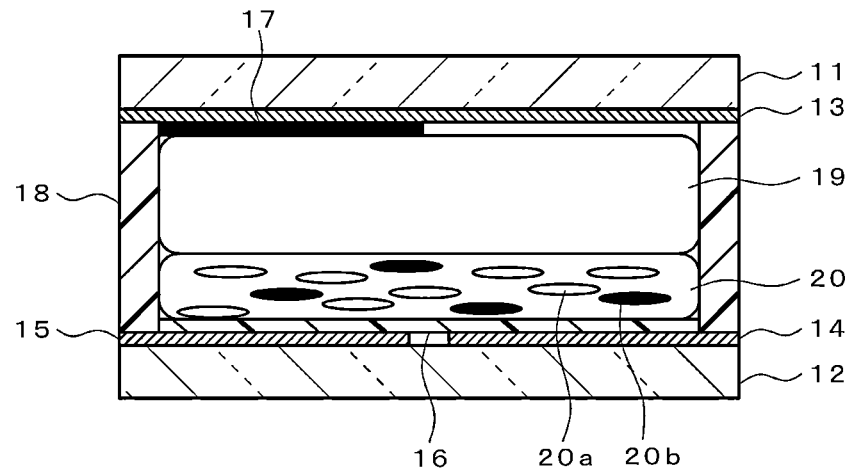
FIG. 1 is a cross section schematically showing the structure of the optical device according to an embodiment of the present invention.
Figure 2:
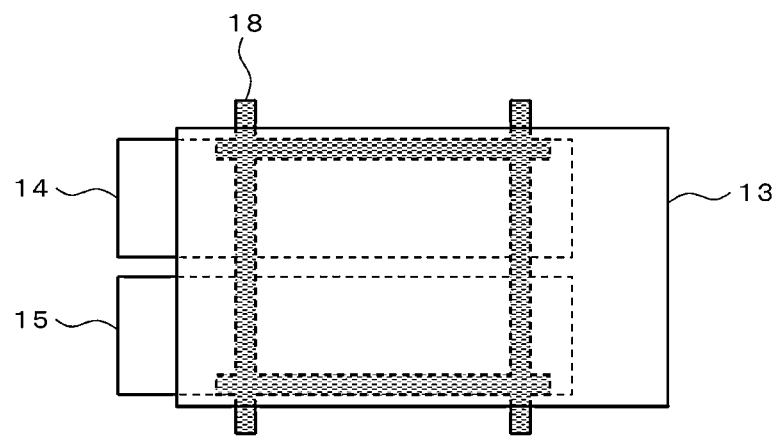
FIG. 2 is a plan view schematically showing the constituent elements of a part of the optical device.

FIG. 1 is a cross section schematically showing the structure of the optical device according to an embodiment. Moreover, FIG. 2 is a plan view schematically showing the constituent elements of a part of the optical device. The optical device shown in the respective diagrams is configured by including a first substrate (upper substrate) 11, a second substrate (lower substrate) 12, a first electrode 13, a second electrode 14, a third electrode 15, a smoothing layer 16, a light shielding layer (light absorbing layer) 17, a partition 18, a first fluid 19, and a second fluid 20.

The first substrate 11 and the second substrate 12 are respectively, for instance, a transparent substrate such as a glass substrate or a plastic substrate. As shown in the diagrams, the upper substrate 11 and the lower substrate 12 are bonded together by providing a predetermined gap (for instance, approximately 6 nm) so that the second electrode 14 and the third electrode 15 are respectively placed opposite the first electrode 13. The gap between the first substrate 11 and the second substrate 12 is maintained with the partition 18 provided between the substrates.

The first electrode 13 is provided on one side of the first substrate 11. Moreover, the second electrode 14 and the third electrode 15 are provided on one side of the second substrate 12. The first electrode 13, the second electrode 14 and the third electrode 15 are formed by patterning a transparent conductive film such as an indium tin oxide film (ITO film) or the like into a predetermined shape. As shown in FIG. 2, the second electrode 14 and the third electrode 15 are formed, for example, in a stripe shape, and at least a part of the second electrode 14 and the third electrode 15 is disposed opposite the first electrode 13.

The smoothing layer 16 is provided on one side of the second substrate 12 so as to cover the second electrode 14 and the third electrode 15. The smoothing layer 16 has water repellency (hydrophobicity) at least on its front surface side, and more preferably has insulation properties. Specifically, the smoothing layer 16 may include an insulating film and a water repellent film laminated thereon. As the insulating film, for instance, preferably used may be a film made of polyimide-based resin, and as the water repellent film, for instance, preferably used may be a film made of a polytetrafluoroethylene-based material.

The light shielding layer 17 is provided on one side of the first substrate 11, and more specifically, may be provided above the first electrode 13. The light shielding layer 17 is disposed at least in a region where the first electrode 13 and the third electrode 15 overlap in a region (refer to FIG. 2) that is surrounded by the partition 18 in a plan view, and prevents light from entering that region. As the light shielding layer 17, for instance, preferably used may be a black color filter, an aluminum film, or a molybdenum film.

The partition 18 is used for defining the space for retaining the first fluid 19 and the second fluid 20 and is provided, for example, as shown in FIG. 2, between the first substrate 11 and the second substrate 12 so that one section becomes a substantial rectangle in a plan view. The partition 18 is formed, for example, by using light curing resin. Disposed in one region (section) defined by the partition 18 are at least a part of the second electrode 14 and the third electrode 15, respectively, and at least a part of the first electrode 13 as shown in FIG. 2. In other words, the first electrode 13 is placed opposite to the second electrode 14 and the third electrode 15 across one region defined by the partition 18.

The first fluid 19 is a liquid body possessing polarity or conductivity, and additionally possessing translucency, and disposed in a region that is defined by the partition 18 between the first substrate 11 and the second substrate 12. As the first fluid 19, for example, water (purified water) is preferably used. In the example shown in FIG. 1, the first fluid 19 is disposed above the second fluid 20 (on the first substrate 11 side), but these mutual oriented states will change according to the voltage application state between the first electrode 13, the second electrode 14 and the third electrode 15 (details will be explained below).

The second fluid 20 is a colored, non-polar fluid in the form of a liquid that is incompatible with the foregoing first fluid 19, and is disposed in the space that is defined by the partition 18 between the first substrate 11 and the second substrate 12. As the second fluid 20, in this embodiment used is a liquid-crystalline material 20a to which pigments 20b have been added. As the pigments 20b, for example, preferably used are pigments (dichroic pigments) in which the absorption volume of light are different according to the polarization direction. As the liquid-crystalline material 20a, for instance, preferably used is a nematic liquid crystal material in which the dielectric constant anisotropy is positive ($\Delta\epsilon > 0$). The nematic liquid crystal material is more preferably added with a chiral material which induces the torsion in the orientation of the liquid crystal molecules.

The optical device of this embodiment is configured as described above, and the operation thereof is now explained in detail.

Figure 3A:
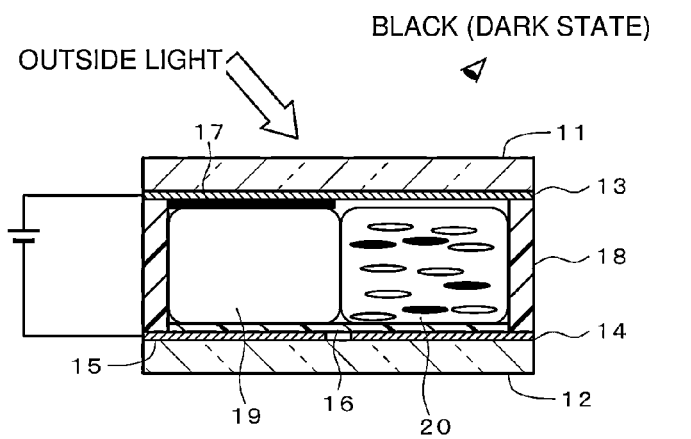
FIGS. 3A to 3C are schematic cross sectional views explaining the operational state of the optical device.
Figure 3B:
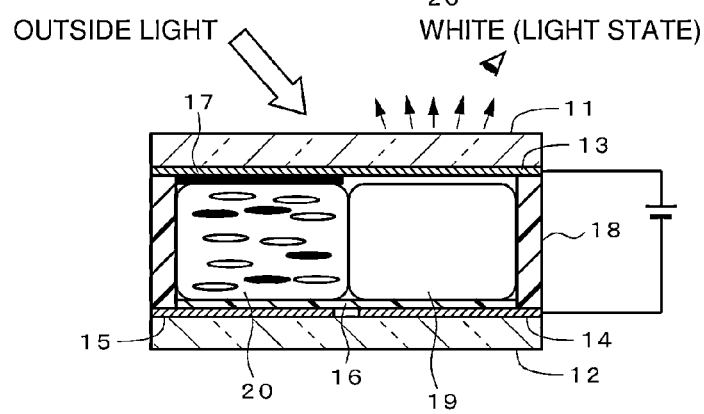
Figure 3C:
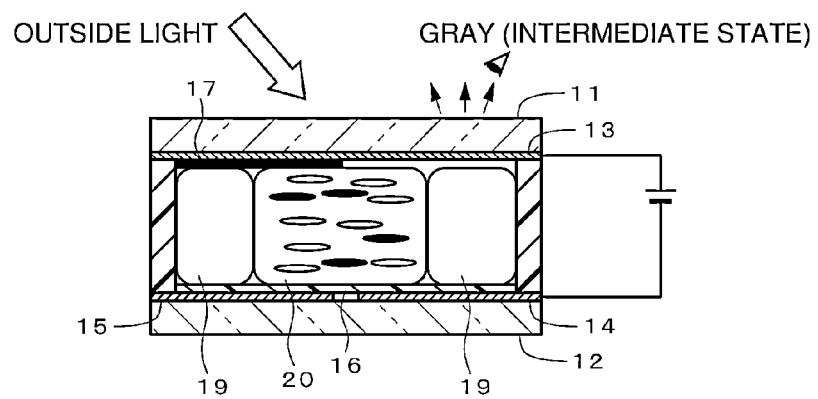

FIGS. 3A to 3C are schematic cross sectional views explaining the operational state of the optical device. Note that the conditions of the voltage to be applied between the first electrode 13 and the second electrode 14 or between the first electrode 13 and the third electrode 15 will depend on various conditions such as the distance between the electrodes, but for instance is a DC voltage of approximately 50 V.

FIG. 3A shows the operational state of the optical device when applying a voltage between the first electrode 13 and the third electrode 15. In the foregoing case, the first fluid 19 made of purified water or the like moves to a region that is sandwiched by the first electrode 13 and the third electrode 15, and the second fluid 20 consequently moves to a region that is sandwiched between the first electrode 13 and the second electrode 14. When this is viewed from the first substrate 11 side, the translucent first fluid 19 is hidden by the light shielding film 17, and the colored second fluid 20 is not shielded by the light shielding film 17, and consequently visually recognized by the viewer as being black (dark state). This arrangement of the first fluid 19 and the second fluid 20 continues even after the voltage is cut off. In other words, the foregoing arrangement has a memory effect. The development of this memory effect is assumed to be a result of the relatively high viscosity of the liquid-crystalline material that was used as the second fluid 20.

FIG. 3B shows the operational state of the optical device when applying a voltage between the first electrode 13 and the second electrode 14. In the foregoing case, the first fluid 19 made of purified water or the like moves to a region that is sandwiched by the first electrode 13 and the second electrode 14, and the second fluid 20 consequently moves to a region that is sandwiched between the first electrode 13 and the third electrode 15. When this is viewed from the first substrate 11 side, the translucent first fluid 19 is not shielded by the light shielding film 17, and the colored second fluid 20 is shielded by the light shielding film 17, and consequently visually recognized by the viewer as being white (light state). As with the foregoing case, this arrangement also has a memory effect.

Moreover, when applying a voltage between the first electrode 13 and the second electrode 14 or between the first electrode 13 and the third electrode 15, when the voltage is cut off midway before the first fluid 19 is fully moved by controlling the application time of the voltage, as shown in FIG. 3C, it is possible to realize an arrangement where a part of the first fluid 19 is positioned between the first electrode 13 and the second electrode 14, and the remaining portion is positioned between the first electrode 13 and the third electrode 15. Here, so as to supplement the arrangement of the first fluid 19, the second fluid 20 is arranged, for instance, across both the second electrode 14 and the third electrode 15 as illustrated in the diagram. When this is viewed from the first substrate 11 side, a part of the translucent first fluid 19 is shielded by the light shielding film 17 and the remaining portion is not shielded by the light shielding film 17, and the colored second fluid 20 is also partially shielded by the light shielding film 17, and consequently visually recognized by the viewer as being gray (intermediate state). As with the foregoing cases, this arrangement also has a memory effect.

As described above, the optical device of this embodiment can realize the two states of light and dark as well as the intermediate state thereof by appropriately controlling the application state and application time of the voltage. For example, gradation display is enabled when the present invention is applied to display usages.

In cases where the optical device of this embodiment is to be used as a reflective display device, by switching the coloration state and the transparent state (light absorbing state), it is possible to realize a display state that is bright and natural when viewed from any angle; that is, without any viewing angle dependency. In addition, since it is possible to realize a relatively high contrast, a display state with superior image visibility can be obtained. Moreover, since power is fundamentally not consumed other than when rewriting the image as a result of leveraging the memory effect, it is possible to realize a display device having extremely low power consumption. Moreover, it is also possible to realize a color display by arbitrarily selecting the color of the pigments to be added to the liquid-crystalline material.

Moreover, the optical device of this embodiment can configure, for example, a dot matrix-type display device by disposing a plurality of regions surrounded by the partition 18 in a matrix. As a result of using the foregoing memory effect, this display device can be driven via line sequential scanning of switching the display of one line at a time without having to provide a switching element such as a thin film transistor to the respective pixels.

The display device to which the optical device of this embodiment is applied can be used in various fields, for instance, as a display of information equipment (personal computers, portable information terminals, mobile phones and the like) that are of low power consumption and which do not require frequent rewriting of images, as an information display screen of a magnetically or electrically recorded cards, in toys for children, as replacements of paper and printed matter (magazines, newspapers, posters and the like), as a display of in-car equipment or aircraft equipment, as a display of watches, as a display of digital still cameras, as a light controlling element in the optical system of strobe lights, vehicle lamps, in-car light systems and the like, and as a light distribution controlling element in general lighting equipment (indoor lighting, street lights, flashlights and the like).

Several examples are now explained.

EXAMPLE 1

A pair of glass substrates with an ITO film was prepared, and a first electrode, a second electrode and a third electrode were formed by patterning the respective ITO films via photolithography. In the ensuing explanation, for the sake of convenience, the glass substrate on which the first electrode is formed is referred to as the "upper substrate", and the glass substrate on which the second electrode and the third electrode are formed is referred to as the "lower substrate".

Subsequently, a black color filter as a light shielding film was patterned at a predetermined location on the upper substrate. The film thickness of the ITO film was 80 nm, the film thickness of the black color filter was 800 nm, and the plate thickness of the glass substrate was 0.7 mm. Moreover, a smoothing layer was formed on the lower substrate. Specifically, a polyimide-based resin material was applied via the spin coating method and thereafter annealed to form an insulating film. The spin coating conditions were 2000 rpm for 5 seconds, and thereafter 4000 rpm for 10 seconds, and the annealing conditions were 220° C. for 60 minutes. Subsequently, a polytetrafluoroethylene material was applied via the spin coating method and thereafter annealed to form a water repellant film on the insulating film. The spin coating conditions were 1500 rpm for 15 seconds, and the annealing conditions were 150° C. for 30 minutes.

Subsequently, a partition was formed on one surface of the upper substrate. Here, a light curing resin material was applied on the glass substrate and calcined via arbitrary conditions, a mask having a predetermined light shielding pattern was thereafter used for exposure, and, by additionally performing a processing procedure, a partition made from a resin material was formed. The size of one section of the partition was set to 200 μm×200 μm, and the height of the partition was set to approximately 6 μm.

Subsequently, purified water as the first fluid and a liquid-crystalline material as the second fluid were disposed on one side of the lower substrate, the upper substrate (with the partition) was superimposed on the foregoing lower substrate, and the periphery of the respective substrates was sealed using an end sealing member. As the method of disposing the respective fluids, various coating methods such as instillation via an inkjet device, a dispenser, a micropipette or the like, a spin coating method, a slit coating method, a bar coating method, a slit spin coating method, a spray coating method and the like may be applied, and an ODF (one drop fill) method that is used in the production process of a liquid crystal display device may also be applied. Here, a small amount of the liquid-crystalline material was instilled on one surface of the lower substrate by using a micropipette, and purified water was sprayed thereon from above via the spray coating method. The spraying conditions of purified water via the spray coating method will vary, but favorable spraying was achieved when the spraying conditions were set to between 5 seconds and 11 seconds. The spray volume of the purified water in the foregoing case is approximately 20 to 50 pl per 1 mm². A plurality of types of dichroic pigments were added, respectively in an amount of approximately 1 wt %, to the liquid-crystalline material as the second fluid to obtain a black color. As the liquid-crystalline material, used was a material in which a chiral material having a chiral pitch of 6 μm was added, in an amount to achieve d/p=1, to a nematic liquid crystal material in which the dielectric constant anisotropy $\Delta\varepsilon$ is positive, the refractive index anisotropy $\Delta n$ is approximately 0.08, and the nematic-isotropic transition temperature is 111° C.

Figure 4A:
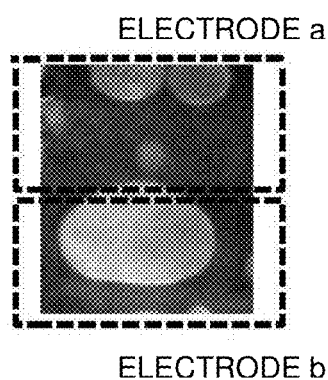
FIGS. 4A to 4E are diagrams showing the observed images of the optical device of Example 1.
Figure 4B:
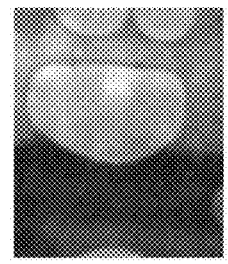
Figure 4C:
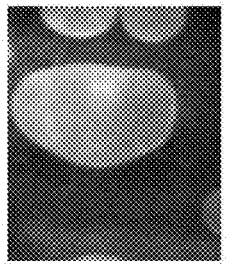
Figure 4D:
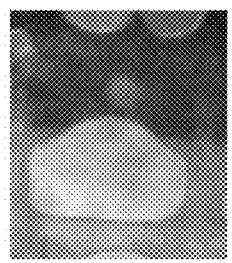
Figure 4E:
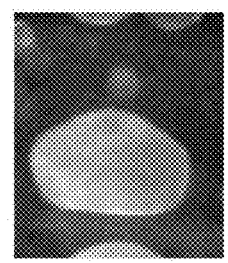

FIGS. 4A to 4E are diagrams showing the observed images of the optical device of Example 1, and all of these diagrams show a state of observing the optical device from the upper substrate side. Note that, for the sake of convenience in observing the behavior of the respective fluids, the optical device was manufactured when omitting the light shielding layer. FIG. 4A is an observed image of the initial state, and the several relatively bright, white droplets are the purified water (first fluid), and the remaining relatively dark portions are the liquid-crystalline material (second fluid). Moreover, the electrode a shown with the dotted line in the diagram shows the region where the second electrode is disposed, and the electrode b shows the region where the third electrode is disposed. Note that the foregoing electrode arrangement is also the same in FIG. 4B to FIG. 4E, but the illustration of the regions where the electrodes are disposed is omitted in the diagrams other than FIG. 4A in order to improve the visibility of the observed image. FIG. 4B is an observed image of a state where a voltage is applied between the first electrode and the second electrode (electrode a), and it can be seen that the droplets of the purified water have moved to a region between the first electrode and the second electrode. An observed image of a state after subsequently cutting off the voltage is shown in FIG. 4C, and it can be seen that the arrangement of the purified water and the liquid-crystalline material is maintained even after the voltage is cut off. FIG. 4D is an observed image of a state where a voltage is applied between the first electrode and the third electrode (electrode b), and it can be seen that several droplets of the purified water have moved to a region between the first electrode and the third electrode. An observed image of a state after subsequently cutting off the voltage is shown in FIG. 4E, and it can be seen that the arrangement of the purified water and the liquid-crystalline material is maintained even after the voltage is cut off. Note that, while not illustrated, and a voltage is applied between the second electrode and the first electrode and between the third electrode and the first electrode in a state where the liquid-crystalline material is disposed between the first electrode and the second electrode, it was confirmed that an overall transparent (light state) is achieved since the liquid crystal molecules in the liquid-crystalline material become re-oriented with the long axis thereof aligned in the electric field direction, and the pigments consequently become re-oriented.

EXAMPLE 2

The optical device of Example 2 was prepared under the same conditions as Example 1 other than using, as the liquid-crystalline material, a nematic liquid crystal material having different a refractive index anisotropy $\Delta n$ and a nematic-isotropic transition temperature. Specifically, the liquid-crystalline material of the optical device of Example 2 had a refractive index anisotropy $\Delta n$ or approximately 0.298, and a nematic-isotropic transition temperature of 130° C. Consequently, the same operation as the optical device of Example 1 was confirmed.

EXAMPLE 3

The optical device of Example 3 was prepared under the same conditions as Example 1 other than using, as the liquid-crystalline material, a nematic liquid crystal material having different a refractive index anisotropy $\Delta n$ and a nematic-isotropic transition temperature. Specifically, the liquid-crystalline material of the optical device of Example 3 had a refractive index anisotropy $\Delta n$ or approximately 0.065, and a nematic-isotropic transition temperature of 86° C. Consequently, the same operation as the optical device of Example 1 was confirmed.

Note that the present invention is not limited to the subject matter of the embodiments and respective examples described above, and may be variously modified and implemented within the scope of this invention.

For example, in the foregoing explanation the first fluid is translucent and the second fluid is colored, but the color of the respective fluids is not limited thereto. In principle, since the combination will suffice so as long as there will be a difference in the transmissivity, reflectance, color or brightness between the first fluid and the second fluid, for instance, both of the fluids may be colored. Moreover, the chiral material may be omitted when using the liquid-crystalline material as the second fluid.

Moreover, while a light shielding layer is provided in the foregoing embodiments, the light shielding layer may be omitted depending on the application of the optical device. For example, in cases where the optical device of the present invention is to be used as an optical switch which attenuates the intensity of light or shields the light as needed, the light shielding layer may be omitted.

Moreover, while the foregoing embodiments assumed a case of mainly using reflected light, configuration that uses transmitted light is also possible. In the foregoing case, a light source (backlight) may be disposed on the back side of the second substrate, and the transmittance of the light that is output from the foregoing light source can be controlled based on the position of the respective fluids.

What is claimed is:

1. An optical device, comprising:
    a first substrate and a second substrate placed opposite each other;
    a partition sandwiched between the first substrate and the second substrate;
    a first electrode provided on one side of the first substrate, at least a part of the first electrode overlapping with a region enclosed by the partition;
    a second electrode and a third electrode provided on one side of the second substrate and which are respectively placed opposite the first electrode across the region enclosed by the partition;
    a smoothing layer provided on one side of the second substrate and which covers the second electrode and the third electrode;
    a light shielding layer disposed on at least one of the first substrate and the second substrate, the light shielding layer being disposed at least in a region where the first electrode and the third electrode overlap; and
    a first fluid and a second fluid, which are immiscible, disposed in the region enclosed by the partition,
    wherein the first fluid posseses polarity or conductivity, and the second fluid comprises liquid crystal material.

2. The optical device according to claim 1, wherein the first fluid is water.

3. A display device comprising the optical device according to claim 1.

4. The optical device according to claim 1, wherein the second fluid contains pigments.

5. The optical device according to claim 4, wherein the second fluid is a chiral material.

* * * * *